US012578001B2

(12) United States Patent
Gluck Griswold et al.

(10) Patent No.: US 12,578,001 B2
(45) Date of Patent: Mar. 17, 2026

(54) BOTTOM DAMPENER FOR CAN RACK SYSTEMS

(71) Applicants: BSH Home Appliances Corporation, Irvine, CA (US); BSH Hausgeräte GmbH, Munich (DE)

(72) Inventors: Sarah Gluck Griswold, Powell, TN (US); Narendra Mal, Knoxville, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 202 days.

(21) Appl. No.: 18/239,157

(22) Filed: Aug. 29, 2023

(65) Prior Publication Data

US 2025/0075768 A1     Mar. 6, 2025

(51) Int. Cl.
| *F16F 9/30* | (2006.01) |
| *B65G 1/02* | (2006.01) |
| *F25D 31/00* | (2006.01) |

(52) U.S. Cl.
CPC ................ *F16F 9/306* (2013.01); *B65G 1/02* (2013.01); *F25D 31/007* (2013.01); *B65G 2207/28* (2013.01); *B65G 2207/32* (2013.01)

(58) Field of Classification Search
CPC ......... F16F 9/30; B65G 1/02; B65G 2007/28; B65G 2207/32; F25D 31/00
See application file for complete search history.

(56) References Cited

U.S. PATENT DOCUMENTS

| 1,905,655 | A | * | 4/1933 | Simpson | ............ | G04B 37/1473 |
| | | | | | | 368/316 |
| 2,005,092 | A | * | 6/1935 | Kuhn | .................... | F25D 31/007 |
| | | | | | | 221/312 R |
| 2,351,432 | A | * | 6/1944 | Jennings | ................. | G07F 11/58 |
| | | | | | | 221/75 |
| 2,376,682 | A | * | 5/1945 | Gerlich | ................... | G07F 11/24 |
| | | | | | | 221/289 |
| 2,564,552 | A | * | 8/1951 | Verdery, Jr. | ............. | G07F 11/60 |
| | | | | | | 221/75 |
| 2,826,471 | A | | 3/1958 | Fonda | | |
| 3,085,712 | A | * | 4/1963 | Skumawitz | ............. | G07F 11/34 |
| | | | | | | 221/312 R |
| 3,185,280 | A | * | 5/1965 | Nathan | ................... | G07F 11/58 |
| | | | | | | 221/253 |

(Continued)

FOREIGN PATENT DOCUMENTS

| CN | 2339942 | Y | | 5/2008 | | |
| CN | 118015756 | A | * | 5/2024 | ............. | B08G 11/04 |

(Continued)

*Primary Examiner* — Rakesh Kumar

(74) *Attorney, Agent, or Firm* — Michael E. Tschupp; Andre Pallapies; Brandon G. Braun

(57) ABSTRACT

A bottom dampener can be provided for a can rack system. The bottom dampener can dampen forces exerted on a bottom of the can rack system by cans inserted into the can rack system. The bottom dampener can include a curved pad, which can fit into a bottom flap of the can rack system. The curved pad can be used for dampening a force exerted by a can on the bottom flap. The bottom dampener can also include one or more tabs. Each of the tabs can fit into a hole along the bottom flap to removably couple the bottom dampener to the can rack system.

15 Claims, 13 Drawing Sheets

(56)                    References Cited

U.S. PATENT DOCUMENTS

| | | | | |
|---|---|---|---|---|
| 4,793,470 A | * | 12/1988 | Andersson | B65G 15/62 |
| | | | | 198/841 |
| 4,998,628 A | | 3/1991 | Ross | |
| 5,356,033 A | | 10/1994 | Delaney | |
| 5,396,997 A | | 3/1995 | Johnson | |
| 5,407,094 A | * | 4/1995 | Vajtay | A47F 1/08 |
| | | | | 221/193 |
| 5,505,332 A | * | 4/1996 | Vogelpohl | G07F 11/16 |
| | | | | 221/193 |
| 6,694,771 B2 | | 2/2004 | Kim | |
| D527,749 S | | 9/2006 | Eveland et al. | |
| 7,891,504 B2 | | 2/2011 | Dement | |
| 8,028,855 B2 | | 10/2011 | White et al. | |
| 8,608,263 B2 | | 12/2013 | Eveland et al. | |
| 9,320,365 B2 | | 4/2016 | Fortuna et al. | |
| 9,400,132 B2 | | 7/2016 | Shrader et al. | |
| 9,907,437 B2 | * | 3/2018 | Smith | A47J 47/16 |
| 2002/0185498 A1 | | 12/2002 | Riordan et al. | |
| 2021/0097968 A1 | * | 4/2021 | Ahlquist | B65D 25/14 |
| 2023/0123861 A1 | * | 4/2023 | Ahlquist | B65D 21/0233 |
| | | | | 206/505 |
| 2025/0075768 A1 | * | 3/2025 | Gluck Griswold | F25D 31/007 |

FOREIGN PATENT DOCUMENTS

| | | | | | | |
|---|---|---|---|---|---|---|
| CN | 221493999 U | * | 8/2024 | | | B21D 55/00 |
| JP | H05128353 A | * | 6/1993 | | | Y02D 30/70 |
| JP | H08315230 A | * | 11/1996 | | | |
| JP | 2001283307 A | * | 10/2001 | | | G07F 9/00 |
| JP | 2001283307 A1 | | 10/2001 | | | |
| JP | 2004038826 A | * | 2/2004 | | | G07F 9/00 |
| JP | 2018029853 A | | 3/2018 | | | |
| JP | 2019175199 A | * | 10/2019 | | | G07F 11/00 |
| KR | 100220735 B1 | * | 9/1999 | | | F25D 23/00 |

* cited by examiner

302b

304b

304d

302a

304a

304c

200

See FIG. 11

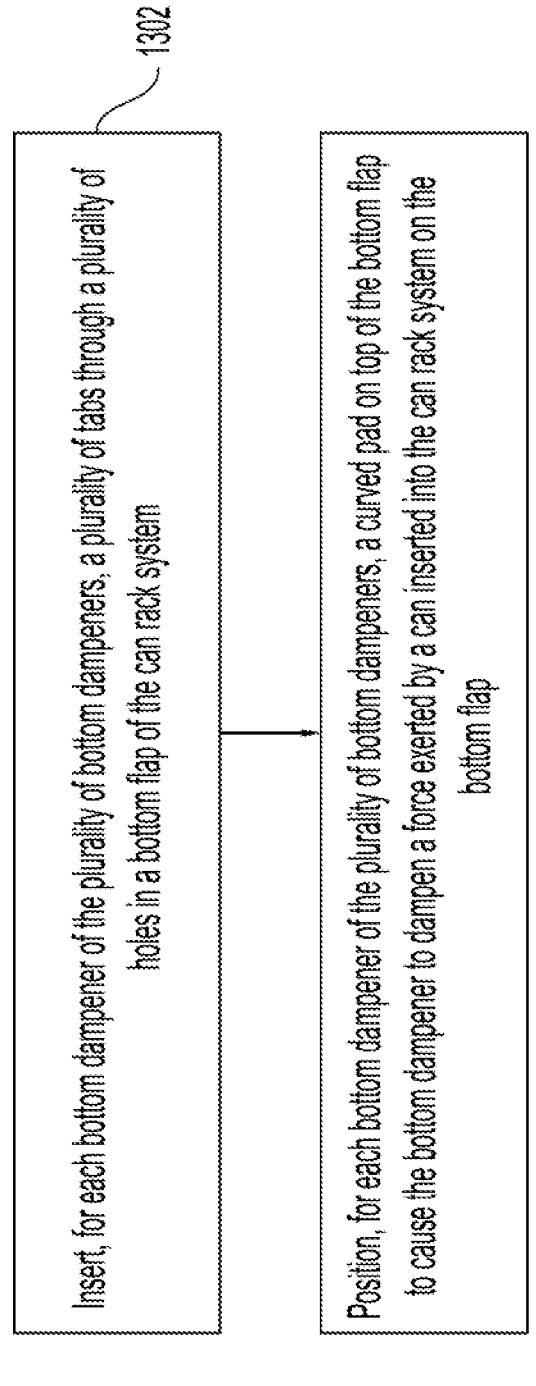

1300

1302

Insert, for each bottom dampener of the plurality of bottom dampeners, a plurality of tabs through a plurality of holes in a bottom flap of the can rack system Position, for each bottom dampener of the plurality of bottom dampeners, a curved pad on top of the bottom flap to cause the bottom dampener to dampen a force exerted by a can inserted into the can rack system on the bottom flap

FIG. 13

BOTTOM DAMPENER FOR CAN RACK SYSTEMS

TECHNICAL FIELD

The present disclosure relates generally to refrigeration appliances and, more particularly (although not necessarily exclusively), to dampening forces exerted by cans in can rack systems of refrigeration appliances via bottom dampeners.

BACKGROUND

Household appliances such as refrigerators can include shelves and drawers for storing items. The household appliances can also include item-specific compartments such as can racks. The can racks can be used to store canned drinks, canned foods, or the like to improve organization within the household appliance and to improve accessibility with respect to canned items. The can racks may be positioned in the refrigeration appliance and may take up substantial space. Therefore, it may be desirable to design a can rack that can fit seamlessly around or near other features of a household appliance. Additionally, users may misuse can racks. For example, users may dispose of or position cans incorrectly within a can rack or may use the can rack to store non-canned items. Misuse of a can rack may cause damage to the non-canned items, cans, or to the can rack itself. Moreover, when cans are inserted into a can rack, the cans may gain speed as the cans fall to a bottom of the can rack. Consequently, the cans may contact the bottom of the can rack with significant force, which can also cause damage to the cans or the can rack. Thus, it may be desirable absorb an impact of cans at the bottom of the can rack. In addition, if maintenance or other services involve disassembling a can rack, it may be advantageous for the can rack or features of the can rack, to be removable using minimal tools.

BRIEF DESCRIPTION OF THE DRAWINGS

FIG. 13 is a flowchart of process for installing a bottom dampener in a front loading can rack system according to one example of the present disclosure.

DETAILED DESCRIPTION

Figure 1:
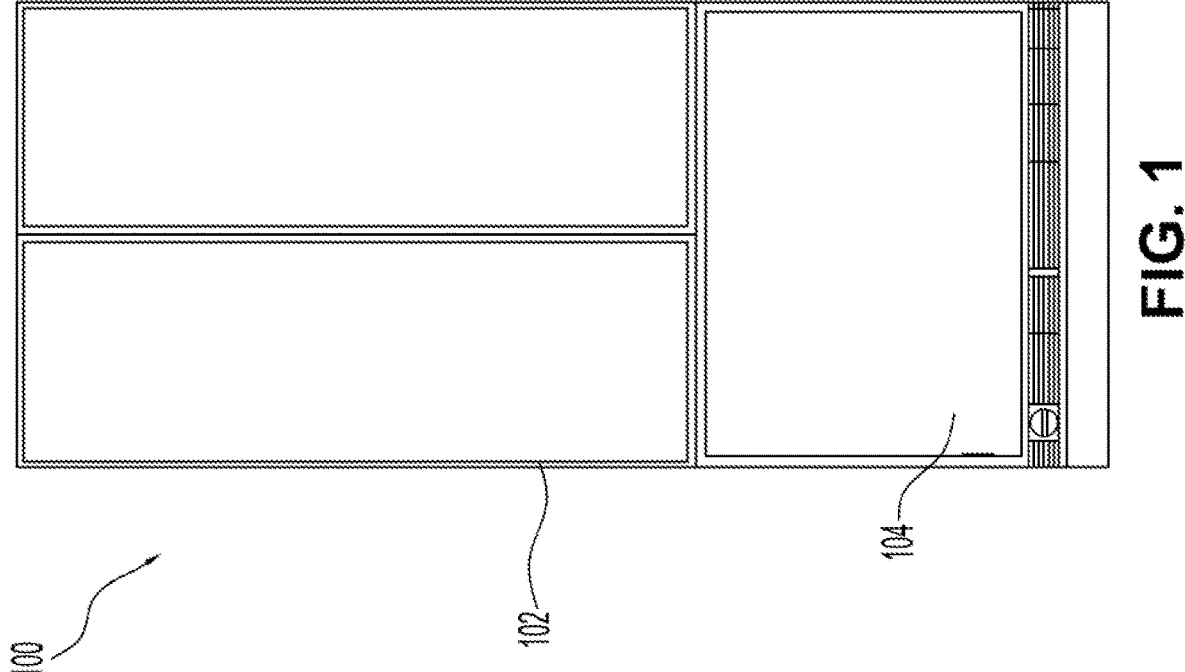
FIG. 1 depicts an example of a refrigeration appliance according to some embodiments of the present disclosure.

Certain aspects and examples of the present disclosure relate to a bottom dampener for dampening forces exerted by cans in a can rack system. More specifically, aspects and examples of the present disclosure are directed to a removable bottom dampener for a front loading can rack system with a top cover. The top cover of the front loading can rack system can prevent users from incorrectly inserting cans into the front loading can rack system.

The front loading can rack system can include a first front opening positioned directly below the top cover though which a user can insert cans into the front loading can rack system. The first front opening can be positioned and sized to promote correct insertion of cans in the front loading can rack system. For example, the first front opening can be rectangular with a width that is greater than a height to promote horizontal insertion of cans. In this way, cans cannot be inserted incorrectly (e.g., vertically) into the front loading can rack system and non-canned objects or objects that are too large for the front loading can rack system cannot be inserted into the front loading can rack system, thereby minimizing a risk of damage to the front loading can rack system. The front loading can rack system can also include a second front opening through which cans can be dispensed. For example, the first front opening can be on a top portion of the front loading can rack system and a second front opening can be on a bottom portion of the front loading can rack system. Thus, a can may be inserted into a compartment of the front loading can rack system via the first front opening. After insertion, the can may fall through the compartment to bottom flaps of the front loading can rack. A user may then retrieve the can from the front loading can rack system via the second front opening.

As the can falls to the bottom flaps, the can may gain speed. As a result, when the can reaches the bottom flaps, the can may exert a significant force on the bottom flaps, which may cause damage to the can or to the front loading can rack system. The force on the bottom flaps can also cause noise and can result in the can bouncing or otherwise falling out of the second opening. To prevent damage to the can and the front loading can rack system, to prevent the can from falling out, and to reduce noise, an impact of the can on the bottom flaps can be reduced via bottom dampeners. The bottom dampeners can be positioned on top of the bottom flaps. The bottom dampeners can each include a curved pad, which can be shaped and sized to cover a bottom flap. Thus, the can may contact curved pads rather than directly contacting the bottom flaps. The curved pads can at least partially reduce the force exerted by the can as the can contacts the curved pads. For example, the curved pads can include one or more layers of a rubber material capable of dampening speed, force, and sound associated with the can.

The bottom dampeners can also each include tabs, which can fit into holes in the bottom flaps to couple each bottom dampener with each bottom flap. The tabs may include a tab neck, which can span a thickness of the bottom flaps. The tabs can also include a tab end, which can be wider than the tab neck. Thus, when the tab neck is positioned within a hole of the bottom flap, the tab end can be disposed on a bottom surface of the bottom flap to keep the tab from sliding out of the hole. Additionally, the bottom dampener, including the tabs and the curved pad, can be made of a single material such as the rubber material. The material of the bottom dampener and dimensions of the tabs can facilitate a secure attachment between the bottom dampeners and the bottom flaps and can facilitate the dampening of the force exerted by the can. The material of the bottom dampener and the dimensions of the tabs can also enable the tabs to be inserted into and removed from the holes easily.

Moreover, because the bottom dampeners can be removably attached to can rack systems, such as the front loading can rack system, rather than being an additional feature of a main body of the can rack systems, the bottom dampeners can be a cost-effective solution for absorbing an impact of cans at a bottom of the can rack systems. The removability of the bottom dampeners can also allow for different bottom dampener designs to be employed within the front loading can rack system or other suitable can rack systems. Thus, the bottom dampeners can be interchangeable depending on, for example, the size of the cans being put into the can rack system. For example, bottom dampeners with a thicker curved pad can be used for food cans, which may be heavier than beverage cans. Additionally, because of the removability, the bottom dampeners can be a different material than the main body. Therefore, a proper material (e.g., the rubber material) for dampening the speed, force, sound, or a combination thereof of the can may be used. The removability further enables easy cleaning and replacement of the bottom dampeners.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 depicts an example of a refrigeration appliance according to some embodiments of the present disclosure. The refrigeration appliance 100 can be a refrigerator, a freezer, or a combination thereof. For example, the refrigeration appliance 100 can include a first cabinet 102 defining a refrigeration space and a second cabinet 104 defining a freezer space. The first cabinet 102 and the second cabinet 104 may be arranged in various orientations, such as the first cabinet 102 positioned above the second cabinet 104 as depicted in FIG. 1. In another example, the first cabinet 102 may be positioned side by side or below the second cabinet 104, or in any other suitable arrangement. The first cabinet 102 or the second cabinet 104 may include a can rack, such as the front loading can rack system 200 depicted in FIG. 2. The first cabinet 102 or the second cabinet 104 may further include an ice maker. For example, the ice maker can be positioned on an inner side of a door of the first cabinet 102 and the can rack can be coupled to the ice maker.

Figure 2:
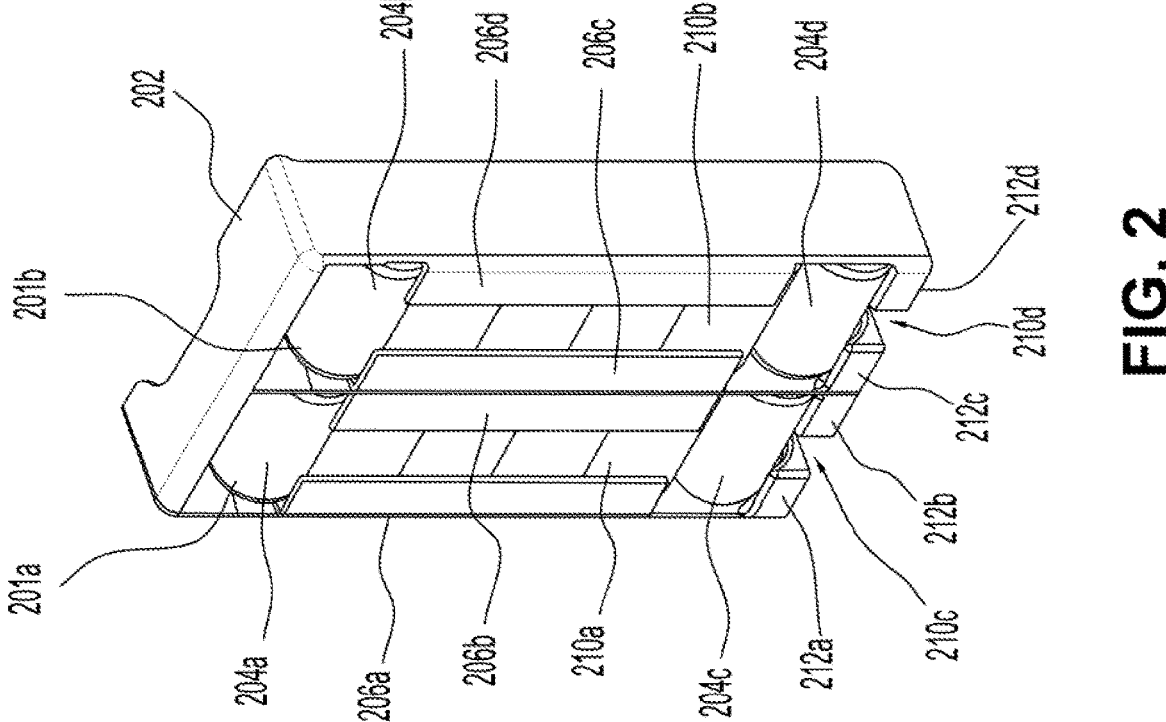
FIG. 2 depicts a front view of front loading a can rack system according to some embodiments of the present disclosure.
Figure 2:

FIG. 2 depicts a front view of a front loading can rack system 200 according to some embodiments of the present disclosure. The front loading can rack system 200 can be positioned in a refrigeration appliance, such as the refrigeration appliance 100 depicted in FIG. 1. For example, the front loading can rack system 200 can be positioned at least partially behind an ice maker on a door of the refrigeration appliance 100. As depicted, the front loading can rack system 200 can be used to store and dispense cans. The front loading can rack system 200 can include a top cover 202, which can prevent users from dropping cans into the rack from above. The top cover 202 can be coupled with at least two walls of the front loading can rack system 200 to provide structural support to the walls. Additionally, in some examples, the top cover 202 may be used as a shelf within the refrigeration appliance.

The front loading can rack system 200 can further include front openings 204a-d. A first front opening 204a and a second front opening 204b can be positioned at a top of the front loading can rack system 200 directly below the top cover 202. The front openings 204a-b can be used for inserting cans into the front loading can rack system 200. For example, a user may insert a can via the first front opening 204a into a first compartment 201a of the front loading can rack system 200. Additionally, a third front opening 204c and a fourth front opening 204d can be positioned on a bottom of the front loading can rack system 200. The front openings 204c-d can be used to retrieve cans from the front loading can rack system 200. For example, the can inserted into the first compartment 201a can fall to the bottom of the front loading can rack system 200. The can may be stored at the bottom for a period of time. Then, the user may retrieve the can via the third front opening 204c.

Additionally, front flaps 206a-d can be positioned on a front side of the front loading can rack system 200 to maintain cans within compartments 201a-b. For example, the front flaps 206a-d may prevent cans from falling out of a front side of the front loading can rack system 200. A first front flap 206a and a second front flap 206b can be associated with the first compartment 201a. A third front flap 206c and a fourth front flap 206d can be associated with a second compartment 201b. In an example, the compartments 201a-b may each hold up to six cans. Alternatively, the compartments 201a-b may hold a different number of cans (e.g., four, eight, or twelve cans). In some examples, a center wall can separate the compartments 201a-b. In other examples, the front loading can rack system 200 may consist of a different number of compartments, or the compartments may not be separated by a wall. Additionally, there can be a first gap 210a between the first front flap 206a and the second front flap 206b. There can also be a second gap 210b between the third front flap 206c and the fourth front flap 206d. The gaps 210a-b can provide a space through which the user may adjust cans positioned in the front loading can rack system 200. For example, the user may turn a can that is not positioned horizontally within the front loading can rack system 200.

Similarly, bottom flaps 212a-d can further maintain cans within the compartments 201a-b by preventing cans from falling out of a bottom side of the front loading can rack system 200. As depicted, a first bottom flap 212a and a second bottom flap 212b can be associated with the first compartment 201a, and a third bottom flap 212c and a fourth bottom flap 212d can be associated with the second compartment 201b. There can be a third gap 210c between the first bottom flap 212a and the second bottom flap 212b. There can also be a fourth gap 210d between the third front flap 206c and the fourth front flap 206d. The gaps 210c-d can provide a space through which the user may interact with cans. For example, a user may use the third gap 210c to lift a can out of third front opening 204c.

In some examples, the front loading can rack system 200 can further include bottom dampeners coupled with the bottom flaps 212a-d. The bottom dampeners can at least partially absorb an impact of a can as the can falls through one of the compartments 201a-b on to the bottom flaps 212a-d. In this way, the bottom dampeners can prevent damage to the cans and the front loading can rack system 200.

Figure 3:
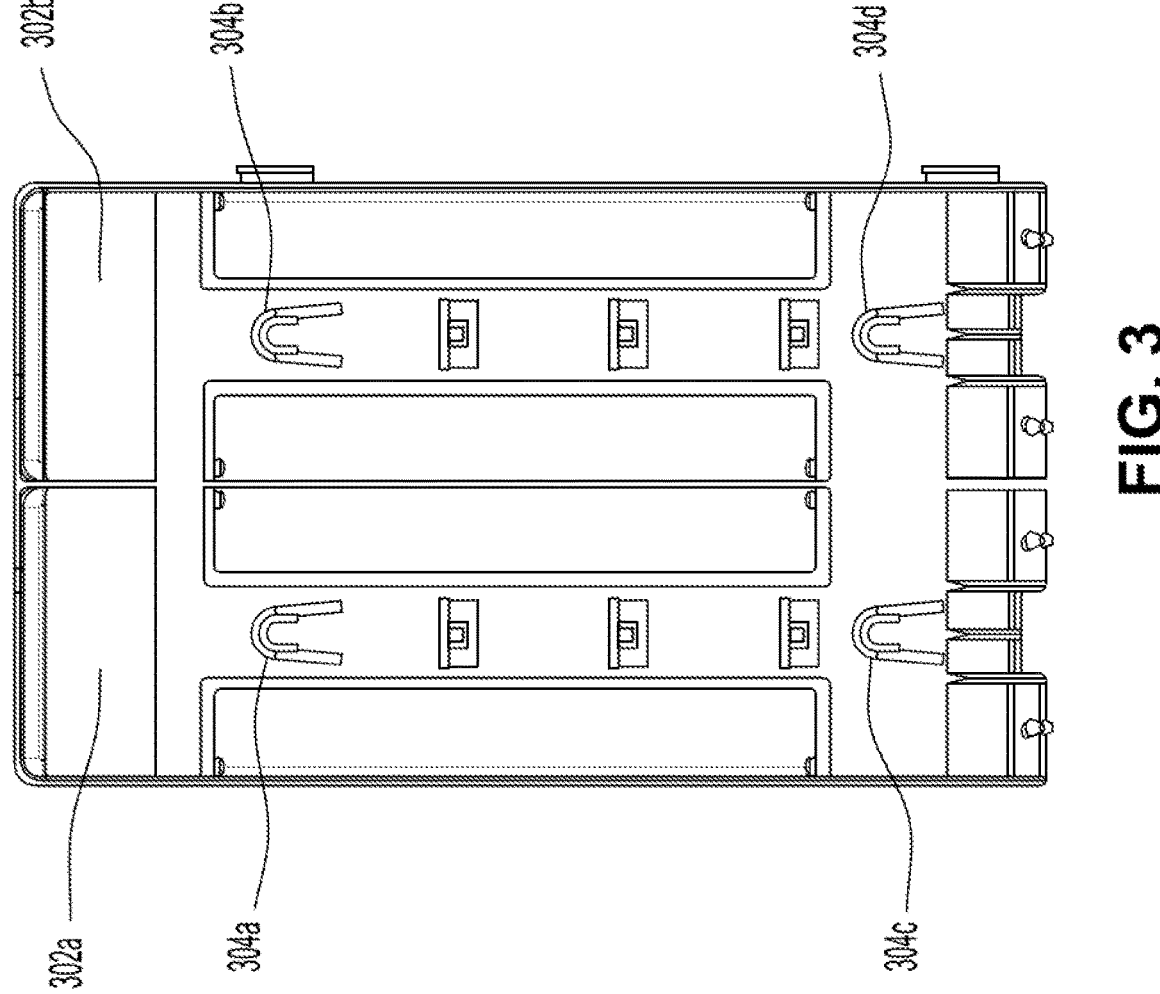
FIG. 3 depicts a back view of a front loading can rack system according to some embodiments of the present disclosure.
Figure 3:
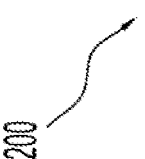

FIG. 3 depicts a back view of a front loading can rack system 200 according to some embodiments of the present disclosure. The front loading can rack system 200 can be positioned in a refrigeration appliance, such as the refrigeration appliance 100 depicted in FIG. 1. To position the front loading can rack system 200 within the refrigeration appliance 100, the front loading can rack system 200 can include back cutouts 302a-b. For example, the front loading can rack system 200 can be positioned at least partially behind an ice maker on a door of the refrigeration appliance 100. Thus, the back cutouts 302a-b can be sized and positioned to fit around the ice maker. In other examples, the front loading can rack system 200 can be below the ice maker or otherwise positioned on the door of the refrigeration appliance. Thus, the back cutouts 302a-b can also be sized and positioned fit around other features of the refrigeration appliance such as shelves. In this way, the front loading can rack system 200 can be seamlessly integrated within the refrigeration appliance to maximize usable volume within the refrigeration appliance.

Additionally, the front loading can rack system 200 can include hook mechanisms 304a-d. The hook mechanisms 304a-d can be positioned on a back wall of the front loading can rack system 200. The hook mechanisms 304a-d can hook onto bolts of the refrigeration appliance to hold the front loading can rack system 200 in place. For example, the ice maker can include bolts onto which the hook mechanisms 304a-b can be fastened. The hook mechanisms 304a-d can each include a lower portion that is wider than an upper portion to facilitate easy installation of the front loading can rack system 200. Then, the upper portion can be sized to fit securely around the bolts.

Figure 4:
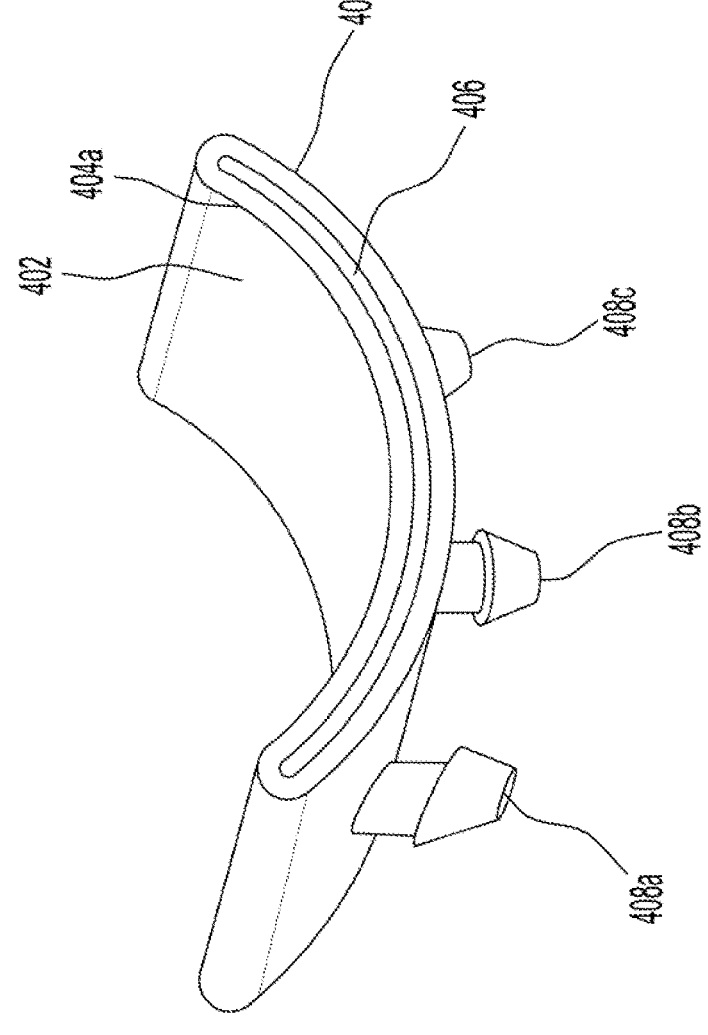
FIG. 4 depicts an example of a bottom dampener for a can rack system according to some embodiments of the present disclosure.

FIG. 4 depicts an example of a bottom dampener 400 for a can rack system according to some embodiments of the present disclosure. The bottom dampener 400 can be removably coupled to a can rack system, such as the front loading can rack system 200 depicted in FIG. 2.

The bottom dampener 400 can include curved pad 402. In some examples, the curved pad 402 can have a top layer 404a and a bottom layer 404b with a hollow core 406 between the layers 404a-b. Due to a first thickness of the top layer 404a and a second thickness of the bottom layer 404b, the bottom dampener 400 can dampen an impact of a can on a bottom of the can rack system. Additionally, by dampening the impact of the can, the bottom dampener 400 can prevent a can from bouncing out of a bottom of the can rack system. Thus, the first and second thickness can be sufficient for dampening the impact while minimizing an additional height of a stack of cans in the can rack system imposed by the bottom dampener 400. In this way, the impact can be absorbed without wasting space within compartments of the can rack system. The hollow core 406 between the layers 404a-b can further enhance the dampening of the impact of the can by the bottom dampener 400. A width of the hollow core 406 can also be sufficiently large for dampening the impact while also minimizing the additional height of the stack of cans in the can rack system imposed by the bottom dampener 400.

The bottom dampener 400 can further include tabs 408a-c for coupling the bottom dampener 400 to a bottom flap of the can rack system. For example, the bottom flap can include holes through which the tabs 408a-c can be inserted.

Figure 5:
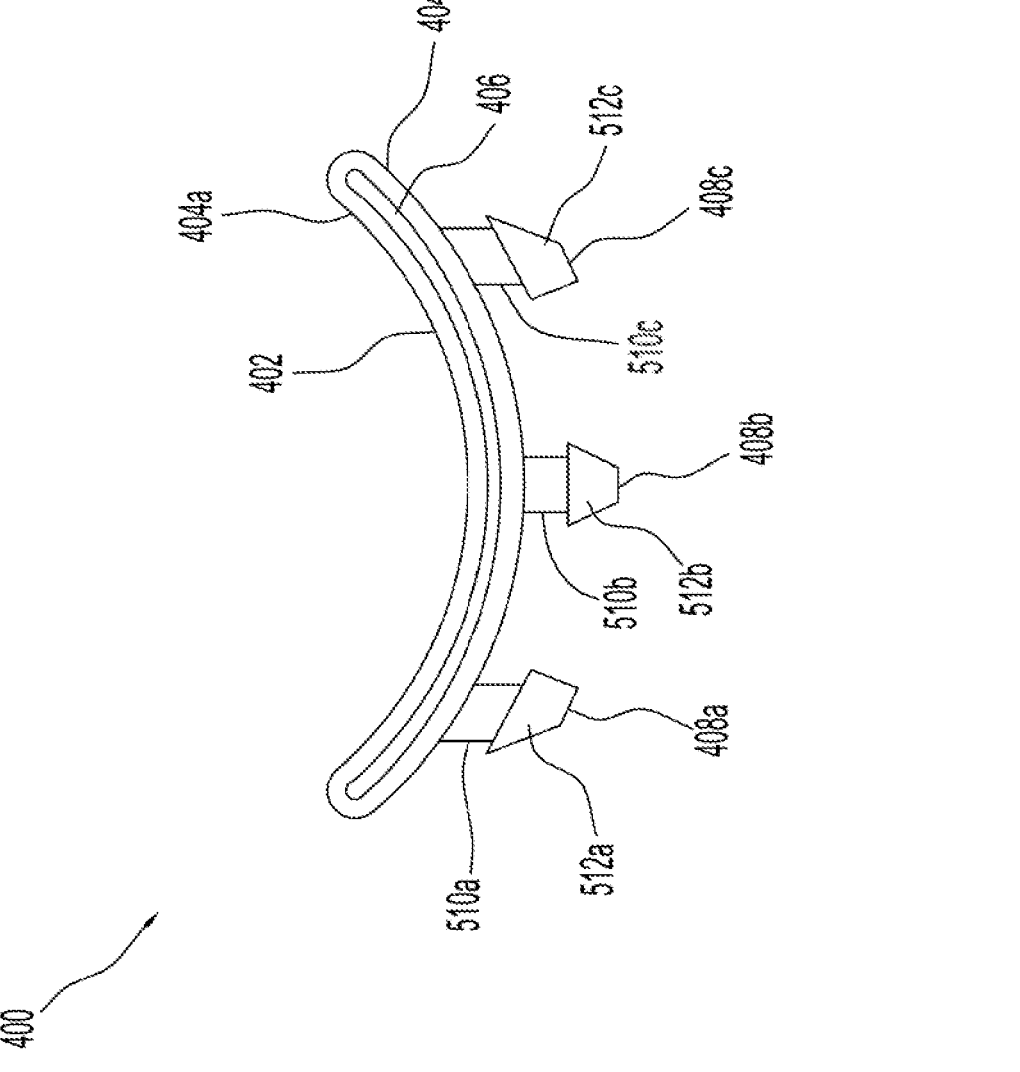
FIG. 5 depicts a side view of a bottom dampener for a can rack system according to some embodiments of the present disclosure.

FIG. 5 depicts a side view of the bottom dampener 400 for a can rack system according to some embodiments of the present disclosure. The bottom dampener 400 can include a curved pad 402 for absorbing an impact of a can in the can rack system, such as the front loading can rack system 200 depicted in FIG. 2. For example, a can may be inserted into the can rack system. The can may then fall through a compartment of the can rack system onto one or more bottom flaps of the can rack system. The curved pad 402 can be positioned on top of a bottom flap such that the can contacts the bottom dampener 400 rather than directly contacting the bottom flap. In this way, the bottom dampener can reduce a force, speed, sound, or combination thereof associated with the can contacting the bottom flap after falling through the compartment.

To absorb the impact and reduce the force, speed, and sound of the can, the curved pad 402 can be composed of a top layer 404a and a bottom layer 404b with a hollow core 406 between the layers 404a-b. Thus, when the can contacts the curved pad 402, the top layer 404a may deform into to the hollow core to absorb the impact and reduce the force, speed and sound. Then, the bottom layer 404b can provide an additional barrier between the can and the bottom flap to further absorb the impact and to protect the can rack system. Thus, a first thickness of the top layer 404a and a second thickness of the bottom layer 404b, can be sufficient for dampening the impact of the can while minimizing an additional height of a stack of cans in the can rack system imposed by the bottom dampener 400. The hollow core 406 can also have a sufficient thickness for enhancing the dampening while also minimizing the additional height of the stack of cans in the can rack system imposed by the bottom dampener 400.

The bottom dampener 400 can further include tabs 408a-c for coupling the bottom dampener 400 to a bottom flap of the front loading can rack system. For example, the bottom flap can include holes through which the tabs 408a-c can be inserted. The tabs 408a-c may each include tab necks 510a-c and tab ends 512a-c. The tab ends 512a-c can be wider than the tab necks 510a-c to maintain a position of the tabs 408a-c within the holes of the bottom flap. For example, each of the tab necks 510a-c can be long enough to span a thickness of the bottom flap. Then, the tab ends 512a-c can be positioned in contact with a bottom side of the bottom flap to prevent the tabs 408a-c from sliding out of the holes of the bottom flap. Thus, the tab ends 512a-c can be wide enough to promote a secure attachment. The tab ends 512a-c can also be small enough and made of a deformable material (e.g., a rubber material) to promote easy insertion of the tabs 408a-c through the holes.

Figure 6:
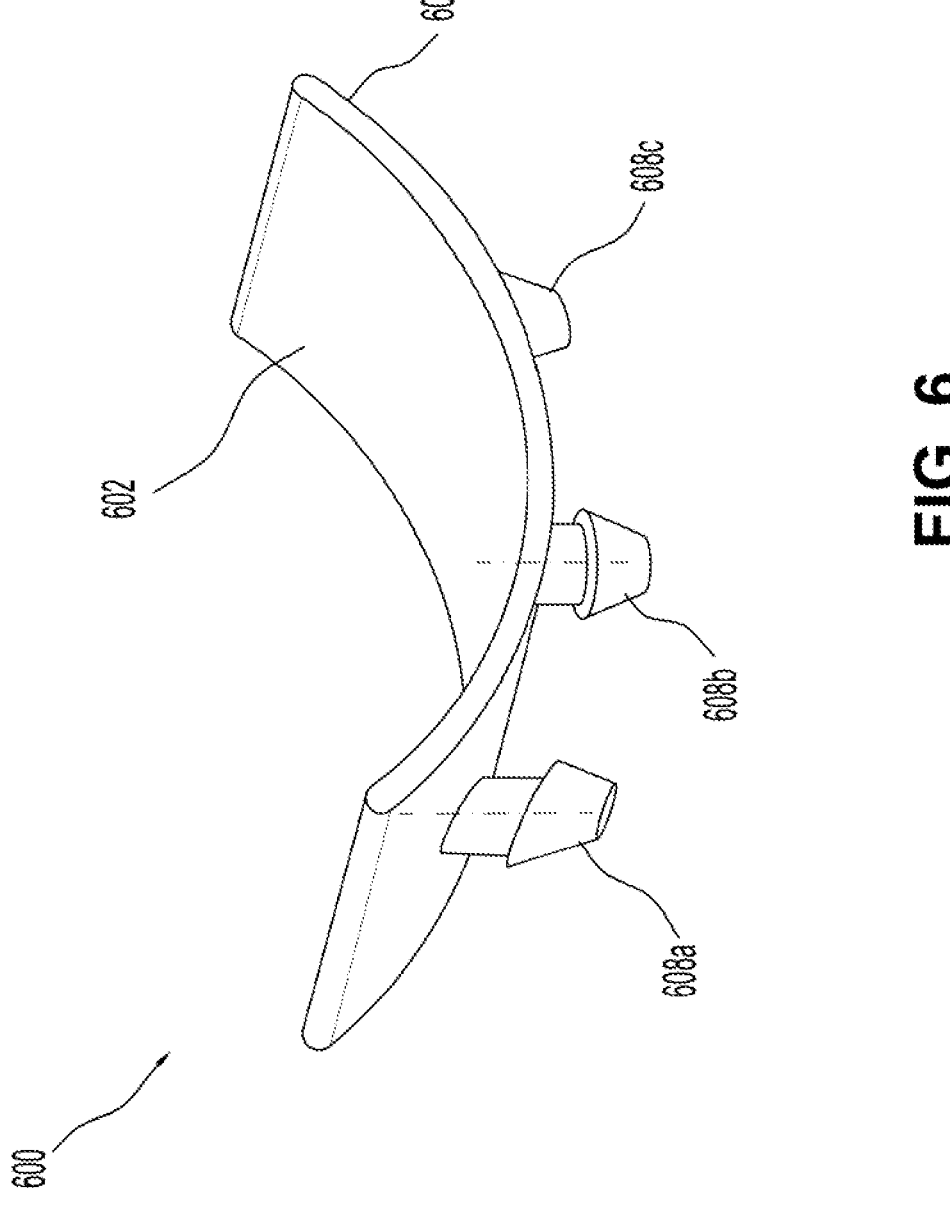
FIG. 6 depicts another example of a bottom dampener for a can rack system according to some embodiments of the present disclosure.

FIG. 6 depicts another example of a bottom dampener 600 for a can rack system according to some embodiments of the present disclosure. The bottom dampener 600 can be removably coupled to a can rack system, such as the front loading can rack system 200 depicted in FIG. 2.

The bottom dampener 600 can include a curved pad 602 that is made of a single layer 604. The single layer 604 can have a sufficient thickness for dampening an impact of a can at a bottom of the can rack system, for preventing a can from bouncing out of the bottom of the can rack system, and for reducing sound associated with the impact of the can. The curved pad 602 with the single layer 604 can be manufactured efficiently and can minimize an additional height of a stack of cans in the can rack system imposed by the bottom dampener 600. In this way, the impact of cans may be absorbed without wasting space within compartments of the front loading can rack system. The bottom dampener 600 can further include tabs 608a-c for coupling the bottom dampener 600 to a bottom of the can rack system. For example, the can rack system can include a bottom flap with holes through which the tabs 608a-c can be inserted.

Figure 7:
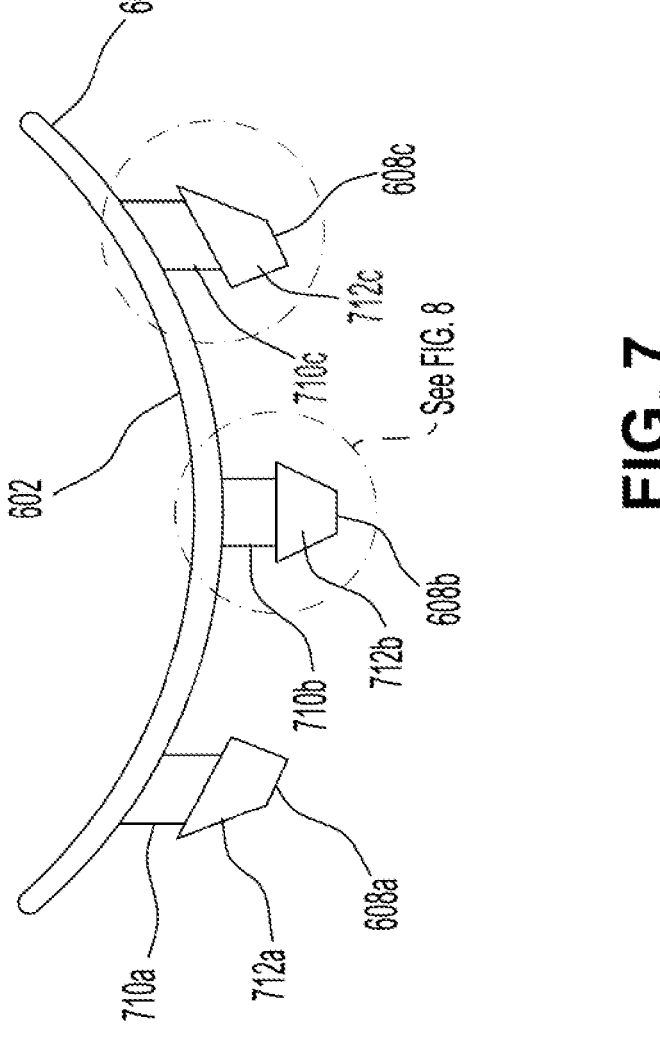
FIG. 7 depicts another side view of a bottom dampener for a can rack system according to some embodiments of the present disclosure.

FIG. 7 depicts another side view of a bottom dampener 600 for a can rack system according to some embodiments of the present disclosure. The bottom dampener 600 can include 602 curved pad for absorbing an impact of a can in the can rack system, such as the front loading can rack system 200 depicted in FIG. 2. For example, a can may be inserted into the can rack system. The can may then fall through a compartment of the can rack system onto one or more bottom flaps of the can rack system. The curved pad 602 can be positioned on top of a bottom flap such that the can contacts the bottom dampener 600 rather than directly contacting the bottom flap. In this way, the bottom dampener can reduce a force, speed, sound, or combination thereof associated with the can contacting the bottom flap after falling through the compartment.

To absorb the impact and reduce the force, speed, and sound of the can, the curved pad 602 can be composed of a single layer 604. When the can contacts the curved pad 602, the single layer 604 may deform to dampen the force, speed, and sound of the can. The single layer 604 can also provide a barrier between the can and the bottom flap to protect the can rack system. Thus, a thickness of the single layer 604 can be sufficient for absorbing the impact of the can while minimizing an additional height of a stack of cans in the can rack system imposed by the bottom dampener 600.

The bottom dampener 600 can further include tabs 608a-c for coupling the bottom dampener 600 to the bottom flap of the can rack system. For example, the bottom flap can include holes through which the tabs 608a-c can be inserted. The tabs 608a-c may each include tab necks 710a-c and tab ends 712a-c. The tab ends 712a-c can be wider than the tab necks 710a-c to maintain a position of the tabs 608a-c within the holes of the bottom flap.

Figure 8:
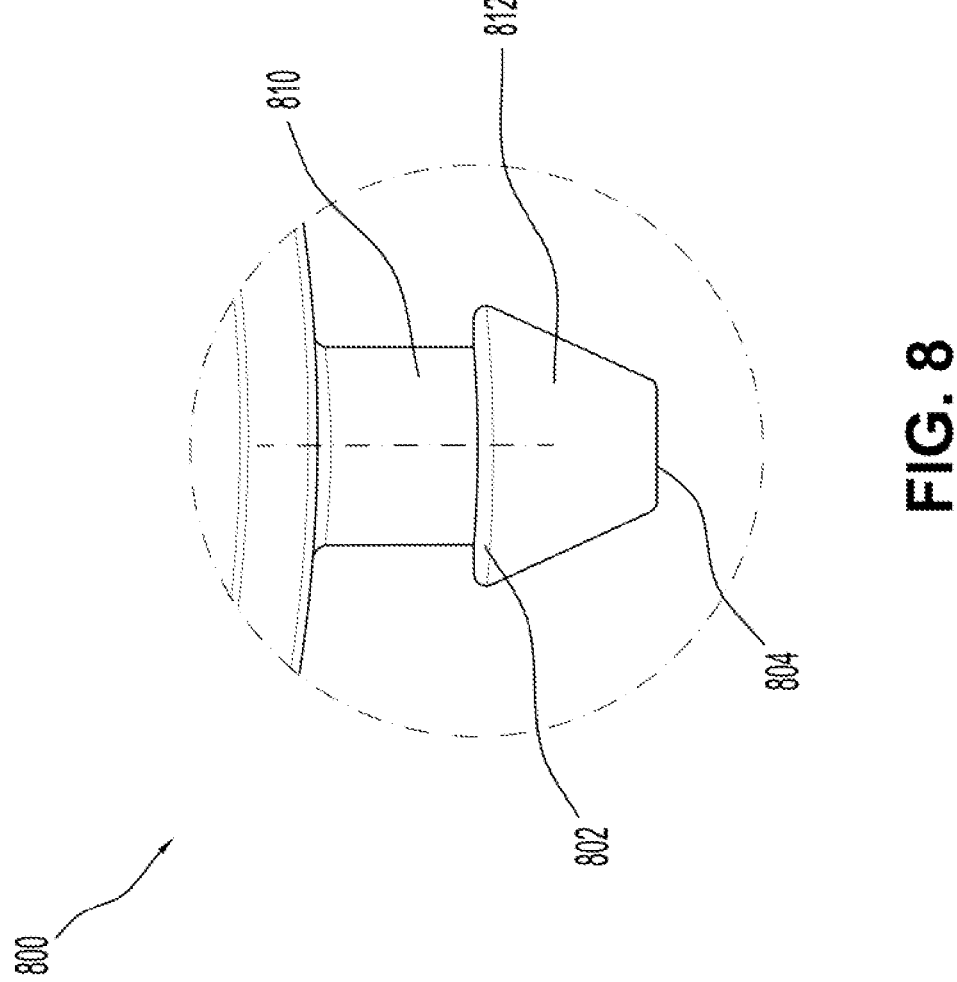
FIG. 8 depicts an example of a tab mechanism for a bottom dampener according to some embodiments of the present disclosure.

FIG. 8 depicts an example of a tab 800 for a bottom dampener according to some embodiments of the present disclosure. The tab 800 may correspond to a second tab 608b depicted in FIG. 7. Thus, in some examples, the tab 800 can be positioned on a bottom side of a single layer of a curved pad, such as the single layer 604 of the curved pad 602 depicted in FIGS. 6 and 7. Alternatively, in some examples, the tab 800 can be positioned on a bottom layer of a multi-layer curved pad, such as the bottom layer 404b of the curved pad 402 depicted in FIGS. 4 and 5.

Additionally, the tab 800 can include a tab neck 810 and a tab end 812. The tab neck 810 can be cylindrical and a length of the tab neck 810 can be equal to a thickness of a bottom flap of a can rack system. At least part of the tab end 812 can be greater in diameter than the tab neck 810. Additionally, as depicted, a bottom 802 of the tab end 812 coupled with the tab neck 810 can be greater in diameter than a top 804 of the tab end 812. This can facilitate easy insertion of the tab 800 in, for example, a hole at a bottom of a can rack system. Then, the bottom 802 of the tab end can contact a bottom surface of the can rack system to maintain a position of the tab 800 in the hole.

Figure 9:
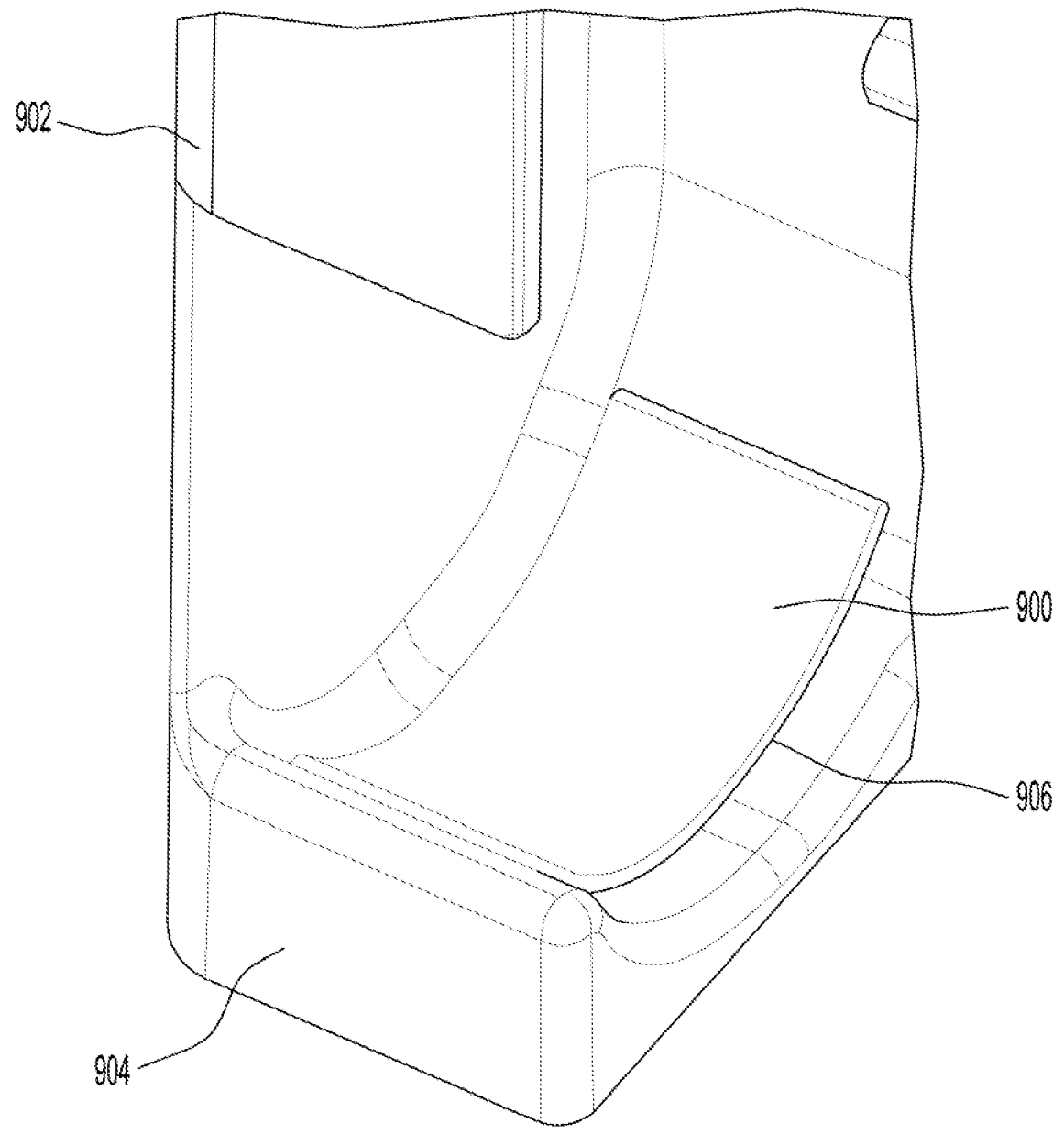
FIG. 9 depicts an example of a bottom dampener coupled with a can rack system according to some embodiments of the present disclosure.

FIG. 9 depicts an example of a bottom dampener 900 in a can rack system 902 according to some embodiments of the present disclosure. The bottom dampener 900 may correspond to the bottom dampener 400 depicted in FIGS. 4 and 5 or may correspond to the bottom dampener 600 depicted in FIGS. 6 and 7. Additionally, the can rack system 902 can correspond to the front loading can rack system 200 depicted in FIG. 2. The bottom dampener 900 can include a curved pad 906 positioned on top of a bottom flap 904 of the can rack system 902. In some examples, a curve of the curved pad 906 can match a curve of the bottom flap 904 to facilitate a seamless fit of the bottom dampener 900 in the can rack system 902. In other examples, the curved pad 906 can be a flat, flexible pad. In the examples in which the curved pad 906 is a flat, flexible pad the curved pad 906 can form-fit to the curve of the bottom flap 904 to facilitate the seamless fit.

Figure 10:
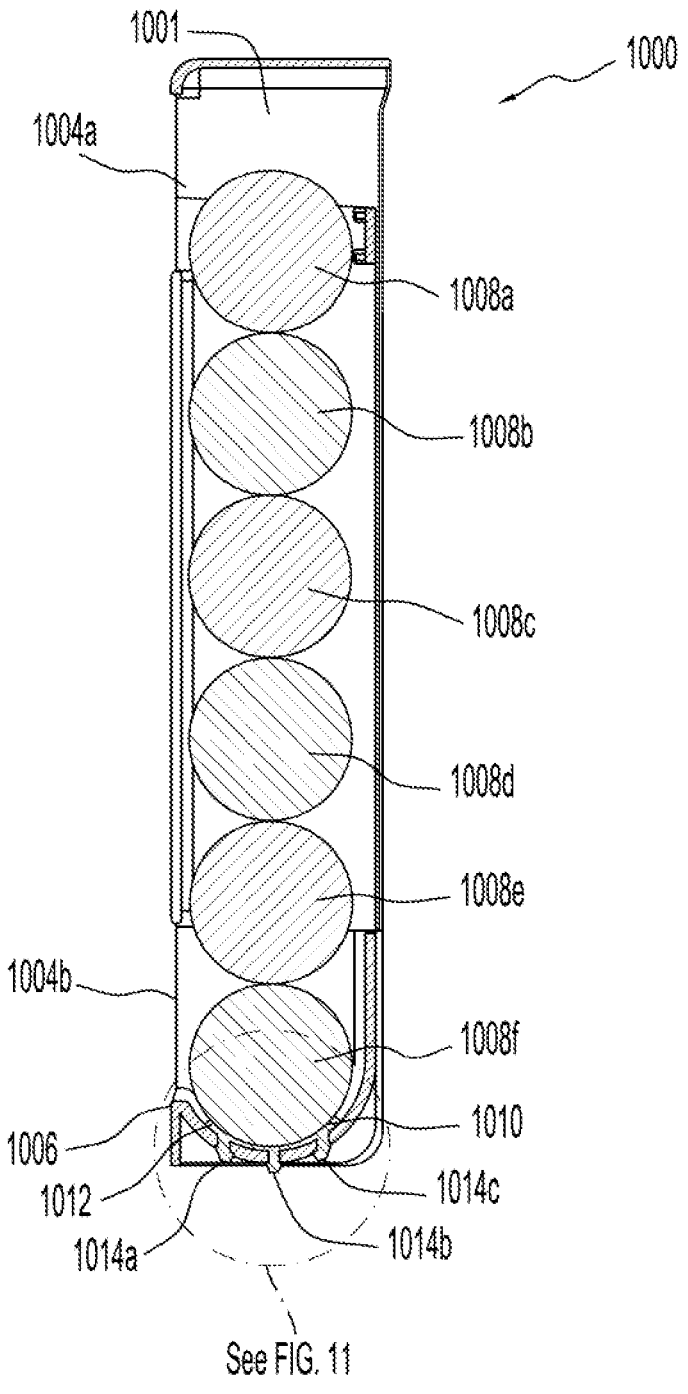
FIG. 10 depicts a cross sectional view of a bottom dampener coupled with a can rack system according to some embodiments of the present disclosure.

FIG. 10 depicts a cross sectional view of a bottom dampener 1010 in a can rack system 1000 according to some embodiments of the present disclosure. The can rack system 1000 can correspond to the front loading can rack system 200 depicted in FIG. 2. The can rack system 1000 can store and dispense cans 1008a-f. For example, each of the cans 1008a-f can be inserted through a first front opening 1004a into a compartment 1001 of the can rack system 1000. Then, a second front opening 1004b can be used to retrieve each of the cans 1008a-f.

After insertion, each of the cans 1008a-f can fall to a bottom flap 1006 of the can rack system 1000 or on to another can. In doing so, an impact of each of the cans 1008a-f on the bottom flap 1006 or other can may damage the cans or the can rack system 1000. Thus, to absorb the impact and therefore prevent the damage to the cans or the can rack system 1000, the bottom dampener 1010 can be positioned on top of the bottom flap 1006. The bottom dampener 1010 can correspond to the bottom dampener 400 depicted in FIGS. 4 and 5 or to the bottom dampener 600 depicted in FIGS. 6 and 7.

The bottom dampener 1010 can include a curved pad 1012 made of one or more layers of a dampening material, such as a rubber material. The curved pad 1012 can have a thickness sufficient for dampening an impact of a can as the can contacts the bottom dampener 1010 after falling through the compartment 1001. Additionally, the bottom dampener 1010 can be removably coupled to the bottom flap 1006. For example, the bottom dampener 1010 can include tabs 1014a-c, and the bottom flap 1006 can include holes through which the tabs 1014a-c can be inserted.

Figure 11:
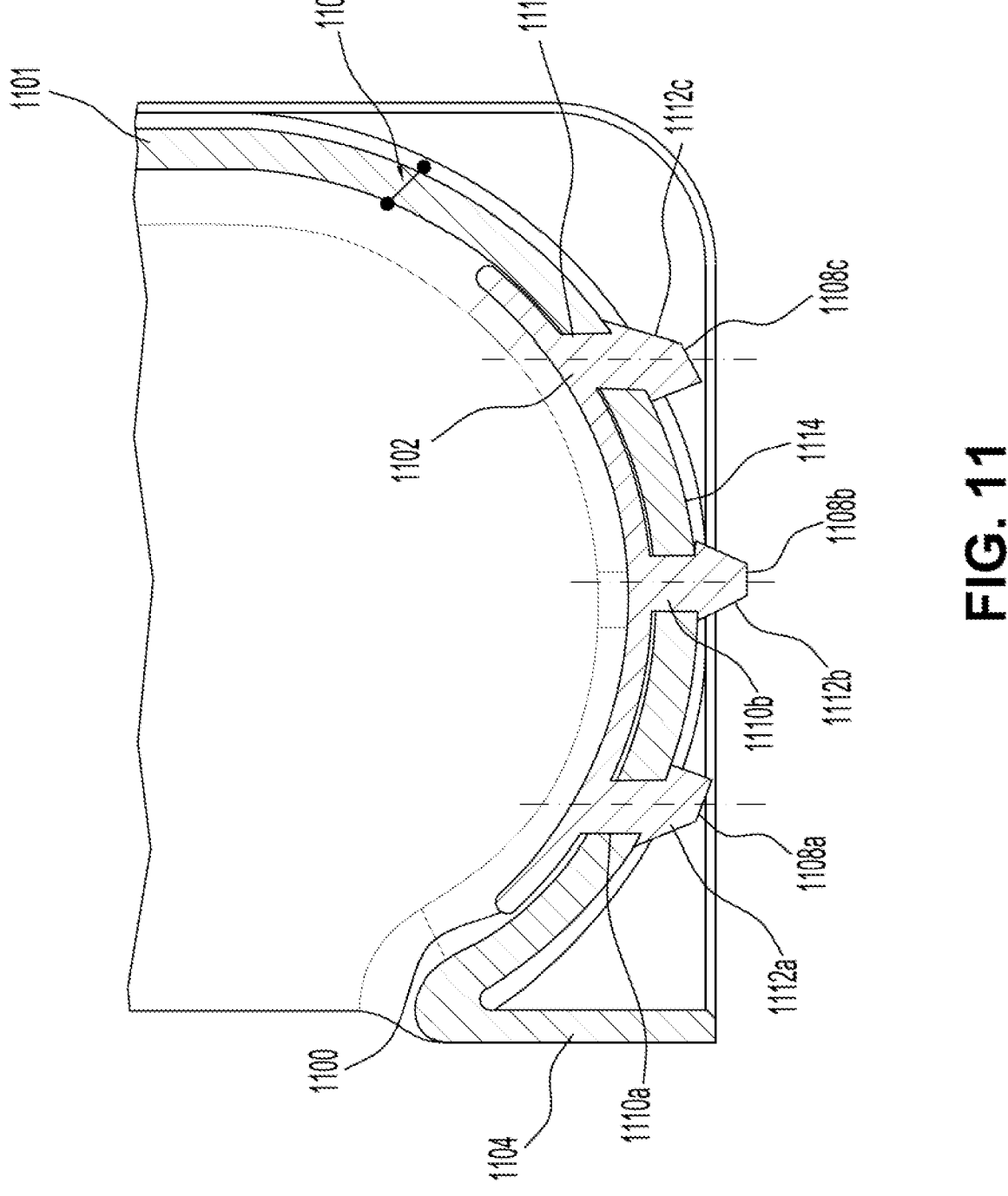
FIG. 11 depicts another a cross sectional view of a bottom dampener coupled with a can rack system according to some embodiments of the present disclosure.

FIG. 11 depicts another a cross sectional view of a bottom dampener 1100 in a can rack system 1101 according to some embodiments of the present disclosure. The bottom dampener 1100 can correspond to the bottom dampener 400 depicted in FIGS. 4 and 5 or to the bottom dampener 600 depicted in FIGS. 6 and 7. The bottom dampener 1100 can include a curved pad 1102 that fit into a bottom flap 1104 of the can rack system 1101. That is, a curve of the curved pad 1102 can match a curve of the bottom flap 1104. The curved pad 1102 can be made of a material, such as a rubber material, that can dampen a force exerted by a can on the bottom flap 1104. By dampening the impact of the can via the curved pad 1102, the bottom dampener 1100 can prevent the can from damaging the bottom flap 1104 or bouncing out of a bottom opening of the can rack system 1101.

Additionally, the bottom dampener 1100 can be removably coupled to the bottom flap 1104. For example, the bottom dampener 1100 can include tabs 1108a-c, and the bottom flap 1104 an include holes in which the tabs 1108a-c can be inserted. The tabs 1108*a-c* may each include tab necks 1110*a-c* and tab ends 1112*a-c*. The tab necks 1110*a-c* can be cylindrical, and a length of the tab necks 1110*a-c* can be equivalent to a thickness 1106 of the bottom flap 1104. Moreover, a bottom of each of the tab ends 1112*a-c* coupled with the tab necks 1110*a-c* can be greater in diameter than the tab necks 1110*a-c*. Thus, when the tabs 1108*a-c* are inserted into the holes, the bottom of the tab ends 1112*a-c* can be in contact with a bottom surface 1114 of the bottom flap 1104 to facilitate a secure connection between the bottom flap 1104 and the bottom dampener 1100. The bottom of each of the tab ends 1112*a-c* can also be greater in diameter than a top of each of the tab ends 1112*a-c* to enable easy insertion of the tabs through the holes.

Additionally or alternatively, in some examples, the tops of the tab ends 1112*a-c* can be curved to match the curve of the bottom flap 1104. For example, as depicted, a first top of a first tab 1108*a* and a second top of a third tab 1108*c* can be curved to match the curve of the bottom flap 1104. This can promote a seamless fit of the bottom dampener 1100 within the can rack system 1101.

Figure 12:
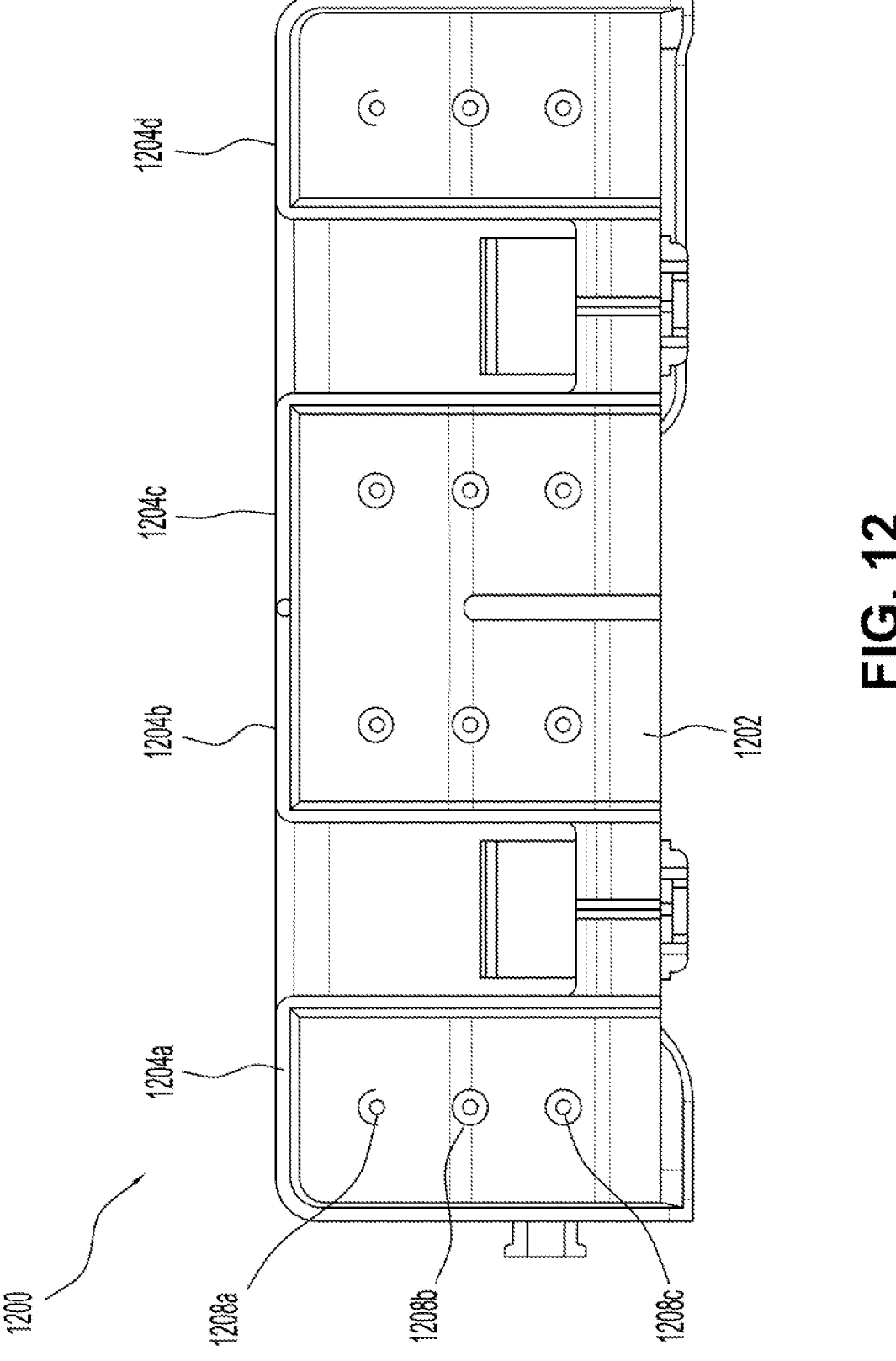
FIG. 12 depicts a bottom view of bottom dampeners coupled with a can rack system according to some embodiments of the present disclosure.

FIG. 12 depicts a bottom view of bottom dampeners in a can rack system 1200 according to some embodiments of the present disclosure. The can rack system 1200 may correspond to the front loading can rack system 200 depicted in FIG. 2. The can rack system 1200 may have bottom flaps 1204*a-d* to which the bottom dampeners can be coupled. As depicted, the bottom dampeners can each include tabs. For example, a first bottom dampener coupled to a first bottom flap 1204*a* can include tabs 1208*a-c*. The tabs 1208*a-c* can be inserted into holes in the first bottom flap 1204*a*. The tabs 1208*a-c* can include tab ends which can be in contact with a bottom surface 1202 of the can rack system 1200 to maintain a position of the tabs within the holes.

FIG. 13 is a flowchart of process for installing bottom dampeners in a can rack system according to one example of the present disclosure. While FIG. 13 depicts a certain sequence of steps for illustrative purposes, other examples can involve more steps, fewer steps, different steps, or a different order of the steps depicted in FIG. 13. The steps of FIG. 13 are described below with reference to the components of FIGS. 1-12 described above.

At block 1302, the process 1300 can involve installing a plurality of bottom dampeners in the can rack system by inserting, for each bottom dampener of the plurality of bottom dampeners, a plurality of tabs through a plurality of holes in a bottom flap of the can rack system. In an example, the can rack system can correspond to the front loading can rack system 200 of FIG. 2. The front loading can rack system 200 can include bottom flaps 212*a-d*. Each of the bottom flaps 212*a-d* may include three holes, and each of the bottom dampeners may include three tabs. Thus, the three tabs of each bottom dampener can be inserted into the three holes in the bottom flap to install the bottom dampeners in the front loading can rack system 200.

At block 1304, the process 1300 can involve installing the plurality of bottom dampeners in the can rack system by positioning, for each bottom dampener of the plurality of bottom dampeners, a curved pad on top of the bottom flap to cause the bottom dampener to dampen a force exerted by a can inserted into the can rack system on the bottom flap. In the example, the can may be inserted into the front loading can rack system 200 via a second front opening 204*b*. The can may then fall through a second compartment 201*b* of the front loading can rack system 200 on to bottom dampeners positioned on each of bottom flaps 212*c-d*. The curved pad of the bottom dampeners can cover a top surface of the bottom flaps and be curved to fit into the bottom flaps 212*c-d*. Thus, the can may impact the curved pad rather than directly contacting the bottom flap. The curved pad can include one or more layers of a dampening material and may further include a hollow core between the layers to further improve a dampening effect of the material. In this way, the curved pad can absorb the impact of the can to reduce the force exerted by the can on the bottom flap.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A bottom dampener for a can rack system, the bottom dampener comprising:
   a curved pad configured to fit on top of a bottom flap of the can rack system for dampening a force exerted by a can on the bottom flap, the curved pad comprising a top layer and a bottom layer, the top layer being a layer of curved pad that is furthest from the bottom flap as compared to the bottom layer, and the top layer and the bottom layer defining a hollow core in between the top layer and the bottom layer; and
   a plurality of tabs, each tab of the plurality of tabs being coupled to and extending from the bottom layer, and each tab of the plurality of tabs being configured to fit into a hole of a plurality of holes within the bottom flap to removably couple the bottom dampener to the can rack system.

2. The bottom dampener of claim 1, wherein a first curve of the curved pad is configured to match a second curve of the bottom flap.

3. The bottom dampener of claim 1, wherein each tab of the plurality of tabs comprises a tab neck, wherein the tab neck is cylindrical, and wherein a length of the tab neck is equal to a thickness of the bottom flap.

4. The bottom dampener of claim 3, wherein each tab of the plurality of tabs comprises a tab end, wherein a bottom of the tab end is greater in diameter than a top of the tab end to facilitate a secure connection the bottom flap and the bottom dampener.

5. The bottom dampener of claim 4, wherein a third curve of the top of the tab end of each tab of the plurality of tabs is configured to match a second curve of the bottom flap.

6. A can rack system comprising:
   a plurality of bottom flaps configured to maintain a position of at least one can in a bottom of the can rack system;
   a plurality of bottom dampeners, each bottom dampener of the plurality of bottom dampeners removably coupled to a bottom flap of the plurality of bottom flaps, each bottom dampener of the plurality of bottom dampeners comprising:
      a curved pad configured to fit on top of a bottom flap of the plurality of bottom flaps for dampening a force exerted by a can inserted into the can rack system on the bottom flap, the curved pad comprising a top layer and a bottom layer, the top layer being a layer of curved pad that is furthest from the bottom flap as compared to the bottom layer, and the top layer and the bottom layer defining a hollow core in between the top layer and the bottom layer; and
      a plurality of tabs, each tab of the plurality of tabs being coupled to and extending from the bottom layer, and each tab of the plurality of tabs being configured to fit into a hole of a plurality of holes within the bottom flap to removably couple the bottom dampener to the bottom flap.

7. The can rack system of claim 6, wherein a first curve of the curved pad is configured to match a second curve of the bottom flap.

8. The can rack system of claim 6, wherein each tab of the plurality of tabs comprises a tab neck, wherein the tab neck is cylindrical, and wherein a length of the tab neck is equal to a thickness of the bottom flap.

9. The can rack system of claim 8, wherein each tab of the plurality of tabs comprises a tab end, wherein a bottom of the tab end is greater in diameter than a top of the tab end to facilitate a secure connection the bottom flap and the bottom dampener.

10. The can rack system of claim 9, wherein a third curve of the top of the tab end of each tab of the plurality of tabs is configured to match a second curve of the bottom flap.

11. A method comprising:

installing a plurality of bottom dampeners in a can rack system by:

positioning, for each bottom dampener of the plurality of bottom dampeners, a curved pad on top of a bottom flap to cause the bottom dampener to dampen a force exerted by a can inserted into the can rack system on the bottom flap, the curved pad comprising a top layer and a bottom layer, the top layer being a layer of curved pad that is furthest from the bottom flap as compared to the bottom layer, and the top layer and the bottom layer defining a hollow core in between the top layer and the bottom layer; and inserting, for each bottom dampener of the plurality of bottom dampeners, each tab of a plurality of tabs through each hole of a plurality of holes in the bottom flap of the can rack system, each tab of the plurality of tabs being coupled to and extending from the bottom layer.

12. The method of claim 11, wherein a first curve of the curved pad is configured to match a second curve of the bottom flap.

13. The method of claim 11, wherein each tab of the plurality of tabs comprises a tab neck, wherein the tab neck is cylindrical, and wherein a length of the tab neck is equal to a thickness of the bottom flap.

14. The method of claim 13, wherein each tab of the plurality of tabs comprises a tab end, wherein a bottom of the tab end is greater in diameter than a top of the tab end to facilitate a secure connection the bottom flap and the bottom dampener.

15. The method of claim 14, wherein a third curve of the top of the tab end of each tab of the plurality of tabs is configured to match a second curve of the bottom flap.

* * * * *